(12) United States Patent
Mittler

(10) Patent No.: US 7,832,628 B2
(45) Date of Patent: Nov. 16, 2010

(54) PROTECTIVE COVER FOR TERMINAL KEYPAD SECURITY SWITCHES

(75) Inventor: Jon Mittler, Reno, NV (US)

(73) Assignee: VeriFone, Inc., San Jose, CA (US)

( * ) Notice: Subject to any disclaimer, the term of this patent is extended or adjusted under 35 U.S.C. 154(b) by 647 days.

(21) Appl. No.: 11/585,673

(22) Filed: Oct. 23, 2006

(65) Prior Publication Data

US 2007/0152042 A1    Jul. 5, 2007

Related U.S. Application Data

(60) Provisional application No. 60/729,132, filed on Oct. 21, 2005.

(51) Int. Cl.
| | |
|---|---|
| G06Q 40/00 | (2006.01) |
| G07D 11/00 | (2006.01) |
| G07F 19/00 | (2006.01) |
| G06K 5/00 | (2006.01) |
| G06C 7/02 | (2006.01) |
| G06C 25/00 | (2006.01) |

(52) U.S. Cl. .................. 235/379; 235/380; 235/145 R; 235/2

(58) Field of Classification Search ................ 235/379, 235/380, 2, 128, 381, 145 R; 902/18; 705/16
See application file for complete search history.

(56) References Cited

U.S. PATENT DOCUMENTS

| | | | | | |
|---|---|---|---|---|---|
| 3,684,842 | A | * | 8/1972 | Boulanger | .................. 200/5 R |
| 3,696,908 | A | * | 10/1972 | Gluck et al. | ............. 400/479.1 |
| 3,829,632 | A | * | 8/1974 | Klehm, Jr. | .................. 200/5 A |
| 3,890,480 | A | * | 6/1975 | Berling et al. | ........... 200/302.2 |
| 3,900,712 | A | * | 8/1975 | Fukao | ........................ 200/307 |
| 3,962,556 | A | * | 6/1976 | Kravchuck | .................. 200/5 R |
| 3,996,441 | A | * | 12/1976 | Ohashi | ........................ 200/309 |
| 4,057,710 | A | * | 11/1977 | Willmott | ................ 235/145 R |
| 4,081,631 | A | * | 3/1978 | Feder | .......................... 200/5 A |
| 4,119,839 | A | * | 10/1978 | Beckmann et al. | ...... 235/145 R |
| 4,163,138 | A | * | 7/1979 | Harden | ........................ 200/310 |
| RE30,435 | E | * | 11/1980 | Fukao | ........................ 200/345 |
| 4,351,988 | A | * | 9/1982 | Allbright | ..................... 200/5 A |
| 4,436,965 | A | * | 3/1984 | Morse | ......................... 379/447 |
| 4,438,300 | A | * | 3/1984 | Morse | ......................... 379/447 |
| 4,501,936 | A | * | 2/1985 | Morse | ......................... 379/451 |
| 4,634,818 | A | * | 1/1987 | Hayes-Pankhurst et al. | . 200/5 A |
| 4,791,278 | A | * | 12/1988 | Hudson et al. | .............. 235/7 R |
| 4,796,007 | A | * | 1/1989 | Heys, Jr. | ....................... 341/31 |
| 4,820,887 | A | * | 4/1989 | Schmitz | ................... 200/43.18 |

(Continued)

*Primary Examiner*—Daniel Walsh
(74) *Attorney, Agent, or Firm*—Kolisch Hartwell, P.C.

(57) ABSTRACT

A point-of-sale terminal may incorporate a security device for preventing penetration of a foreign conductor into a region in fluid communication with a security switch of the point-of-sale terminal. The device may include a barrier member configured to be disposed inside the terminal and to resist penetration by a hypodermic needle. The barrier member of the security device may be a rigid keypad cover configured to be disposed between a keypad of the terminal and an upper casing of the terminal, and may include a plurality of apertures configured to fit closely around keys of the keypad. The barrier member of the security device also may be a rigid light guide configured to be disposed between a printed circuit board of the terminal and a keypad of the terminal, and to provide backlighting to the keypad.

6 Claims, 6 Drawing Sheets

U.S. PATENT DOCUMENTS

| | | | | |
|---|---|---|---|---|
| 4,992,645 A * | 2/1991 | Kasahara et al. | | 235/10 |
| 5,044,798 A * | 9/1991 | Roylance et al. | | 400/472 |
| 5,340,955 A * | 8/1994 | Calvillo et al. | | 200/302.2 |
| 5,573,107 A * | 11/1996 | Nakano et al. | | 200/314 |
| 5,577,267 A * | 11/1996 | Jungles-Butler et al. | | 455/575.1 |
| 5,711,588 A * | 1/1998 | Rudisill | | 362/30 |
| 5,722,055 A * | 2/1998 | Kobayashi et al. | | 455/575.8 |
| 5,772,010 A * | 6/1998 | Watanabe et al. | | 200/406 |
| 5,844,166 A * | 12/1998 | Halttunen et al. | | 174/381 |
| 5,867,772 A * | 2/1999 | Jonsson et al. | | 455/575.1 |
| 6,006,118 A * | 12/1999 | Stephenson | | 455/575.1 |
| 6,065,679 A * | 5/2000 | Levie et al. | | 235/462.47 |
| 6,073,838 A * | 6/2000 | Baitz et al. | | 235/380 |
| 6,103,346 A * | 8/2000 | Nakajo et al. | | 428/172 |
| 6,181,361 B1 * | 1/2001 | Bluteau et al. | | 347/222 |
| 6,448,957 B1 * | 9/2002 | Chia-Hung | | 345/161 |
| 6,633,241 B2 * | 10/2003 | Kaikuranta et al. | | 341/33 |
| 6,664,486 B2 * | 12/2003 | Yoon et al. | | 200/5 A |
| 6,701,159 B1 * | 3/2004 | Powell | | 455/575.8 |
| 6,728,555 B1 * | 4/2004 | Pirila et al. | | 455/566 |
| 6,743,993 B1 * | 6/2004 | Clark et al. | | 200/314 |
| 6,765,503 B1 * | 7/2004 | Chan et al. | | 341/22 |
| 6,806,815 B1 * | 10/2004 | Kaikuranta et al. | | 341/22 |
| 6,876,313 B2 * | 4/2005 | Hsiung et al. | | 341/35 |
| 7,133,707 B1 * | 11/2006 | Rak et al. | | 455/575.1 |
| 7,217,893 B1 * | 5/2007 | Huang et al. | | 200/1 B |
| 7,270,275 B1 * | 9/2007 | Moreland et al. | | 235/492 |
| 7,525,061 B2 * | 4/2009 | Kobayashi et al. | | 200/520 |
| 2001/0042681 A1 * | 11/2001 | Yoon et al. | | 200/517 |
| 2002/0056626 A1 * | 5/2002 | Ito et al. | | 200/293 |
| 2003/0160712 A1 * | 8/2003 | Levy | | 341/22 |
| 2003/0222135 A1 * | 12/2003 | Stoutenburg et al. | | 235/379 |
| 2004/0053648 A1 * | 3/2004 | Gremo et al. | | 455/575.1 |
| 2004/0097256 A1 * | 5/2004 | Kujawski | | 455/550.1 |
| 2004/0168898 A1 * | 9/2004 | Kiyosawa et al. | | 200/511 |
| 2006/0011461 A1 * | 1/2006 | Chan et al. | | 200/344 |
| 2006/0037848 A1 * | 2/2006 | Kobayashi | | 200/310 |
| 2006/0084305 A1 * | 4/2006 | Chen | | 439/159 |
| 2006/0137966 A1 * | 6/2006 | Kato | | 200/512 |
| 2006/0192714 A1 * | 8/2006 | Koyama et al. | | 343/702 |
| 2006/0232557 A1 * | 10/2006 | Fallot-Burghardt | | 345/168 |
| 2007/0025071 A1 * | 2/2007 | Yokote et al. | | 361/680 |
| 2007/0051603 A1 * | 3/2007 | Hakunti et al. | | 200/310 |
| 2007/0062793 A1 * | 3/2007 | Hung | | 200/310 |
| 2007/0090176 A1 * | 4/2007 | Tracy | | 235/145 R |
| 2007/0152042 A1 * | 7/2007 | Mittler | | 235/383 |
| 2007/0199814 A1 * | 8/2007 | Kobayashi et al. | | 200/520 |
| 2008/0237012 A1 * | 10/2008 | Koike et al. | | 200/314 |
| 2008/0278353 A1 * | 11/2008 | Smith et al. | | 341/22 |
| 2009/0078552 A1 * | 3/2009 | Takemae et al. | | 200/344 |
| 2009/0134002 A1 * | 5/2009 | Chyc et al. | | 200/512 |
| 2009/0173610 A1 * | 7/2009 | Bronstein et al. | | 200/314 |
| 2009/0178907 A1 * | 7/2009 | Cheng | | 200/310 |

\* cited by examiner

PROTECTIVE COVER FOR TERMINAL KEYPAD SECURITY SWITCHES

RELATED APPLICATIONS

The present application claims the benefit of U.S. Provisional Patent Application Ser. No. 60/729,132, filed on Oct. 21, 2005, the complete disclosure of which is hereby incorporated by reference herein in its entirety and for all purposes.

BACKGROUND

Point-of-sale (POS) terminals allow customers to pay for purchases using a wide variety of payment methods, such as with credit cards, debit cards, and ATM cards, among others. Payment information typically is encrypted before transmission from the POS terminal to a payment center, and also may be secured through other means, such as authentication using a personal identification number (PIN) entered by the customer on a keypad. Ideally, a POS terminal should be configured to detect attempts to tamper with the keypad area, to avoid the possibility of fraud by, for example, illicitly recording or otherwise intercepting unencrypted PIN numbers or other information.

Typically, a POS keypad is constructed of silicone rubber or a similar material, and detection of tampering usually is accomplished with a group of security switches used in conjunction with one or more printed circuit boards (PCBs) embedded in or under the keypad. For example, a POS terminal may include a pair of circuit boards, with a conductor disposed between the circuit boards such that when the case of the terminal is opened, an electrical connection between the circuit boards is broken, triggering a tamper detection circuit.

Alternatively, the POS keypad may include conductive "pills" that short across patterns of traces on a single PCB, and which function as security switches. FIG. 1 shows a partially exploded view of the top portion of such a prior art POS terminal, generally indicated at 10. Terminal 10 includes an outer case (of which the top portion 12 is shown in FIG. 1), a keypad 14, and a PCB 16. As indicated, one or more security switches 18 may be attached to or formed integrally with the keypad. Security switches 18 generally are formed from carbon or another suitably conductive material, and are configured to make conductive contact with at least two separate conductive traces on the PCB when the terminal is assembled, thus completing a circuit. If the keypad is separated from the PCB, the circuit is broken, prompting one or more security measures (such as disablement of the terminal).

The methods of tamper resistance described above are simple and cost-effective, but may be prone to attack by insertion of a foreign conductor. For example, FIG. 2 depicts a sectional view of prior art system 10 of FIG. 1 being attacked by a hypodermic needle 20 filled with a conducting fluid. The hypodermic needle is easily pushed through the soft silicone of the keypad at the top surface of the terminal, and an attacker may use the needle to probe between the soft key tops 22 and the edges 24 of the keypad openings in the case, until the tip 26 of the needle reaches the security switch locations. A conductive liquid then may be injected into the security switch area, permanently shorting the security switches, and allowing the attacker to remove the keypad.

One method of protecting against the type of hypodermic needle attack described above has been to make the keys of the terminal keypad very tall relative to their length and width, which limits the insertion angle of the needle. However, this is unsatisfactory because it makes the terminal larger and heavier than necessary, limits the size of keys, and increases the cost and difficulty of making the parts.

Alternatively, one or more PCBs of the terminal may be embedded (or "potted") in epoxy resin, effectively integrating the keypad and PCBs into a single module and preventing removal of the PCBs. However, this approach prevents removal and servicing of the PCBs by authorized—as well as unauthorized—personnel, and also may be subject to attacks involving epoxy solvents. Thus, a need exists for an enhanced POS terminal security system, to resist attacks effectively while still providing relatively convenient authorized access to the interior of the terminal.

DETAILED DESCRIPTION

Figure 1:
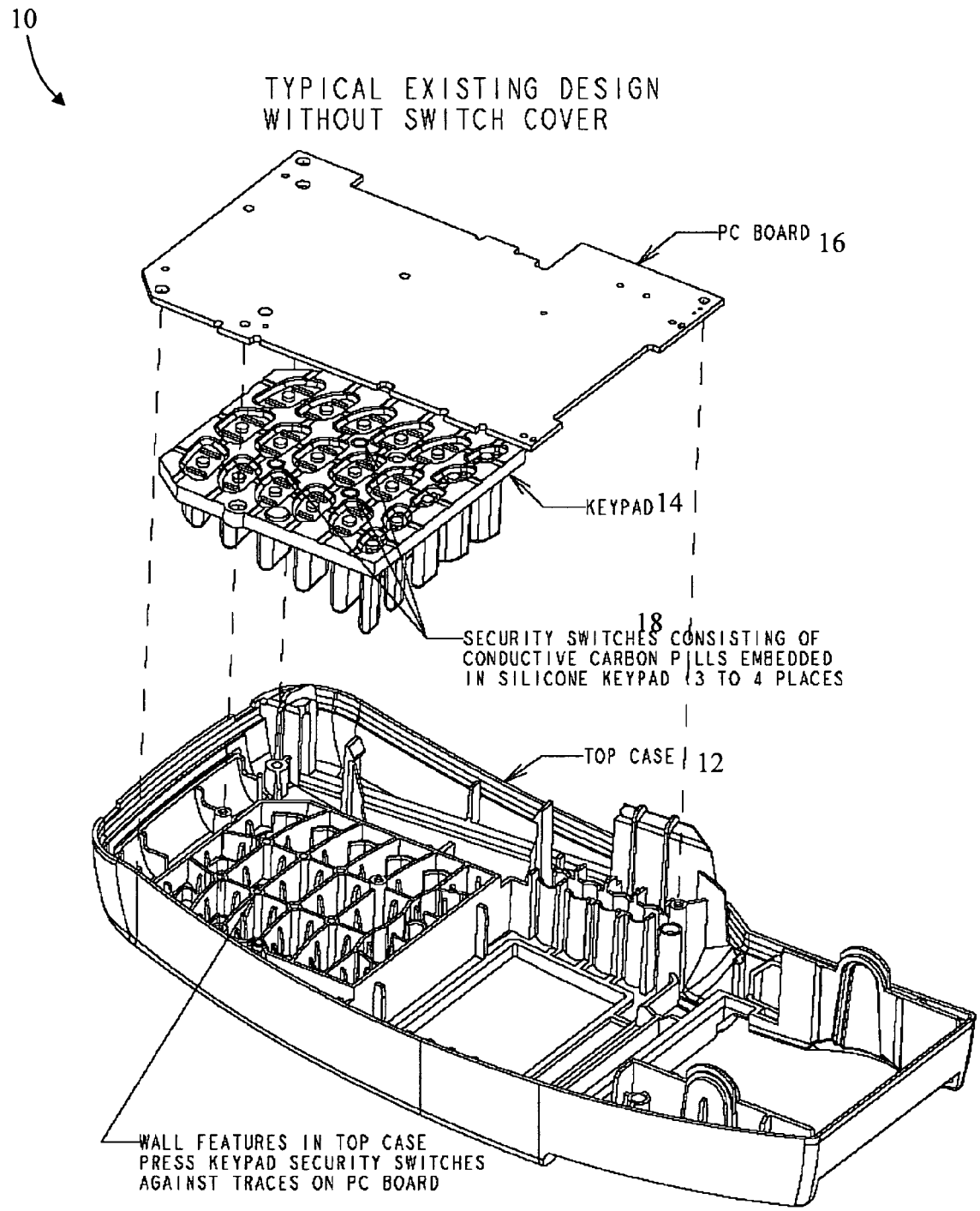
FIG. 1 is an exploded view of a portion of a typical prior art point-of-sale terminal, incorporating conductive elements embedded in the keypad.
Figure 2:
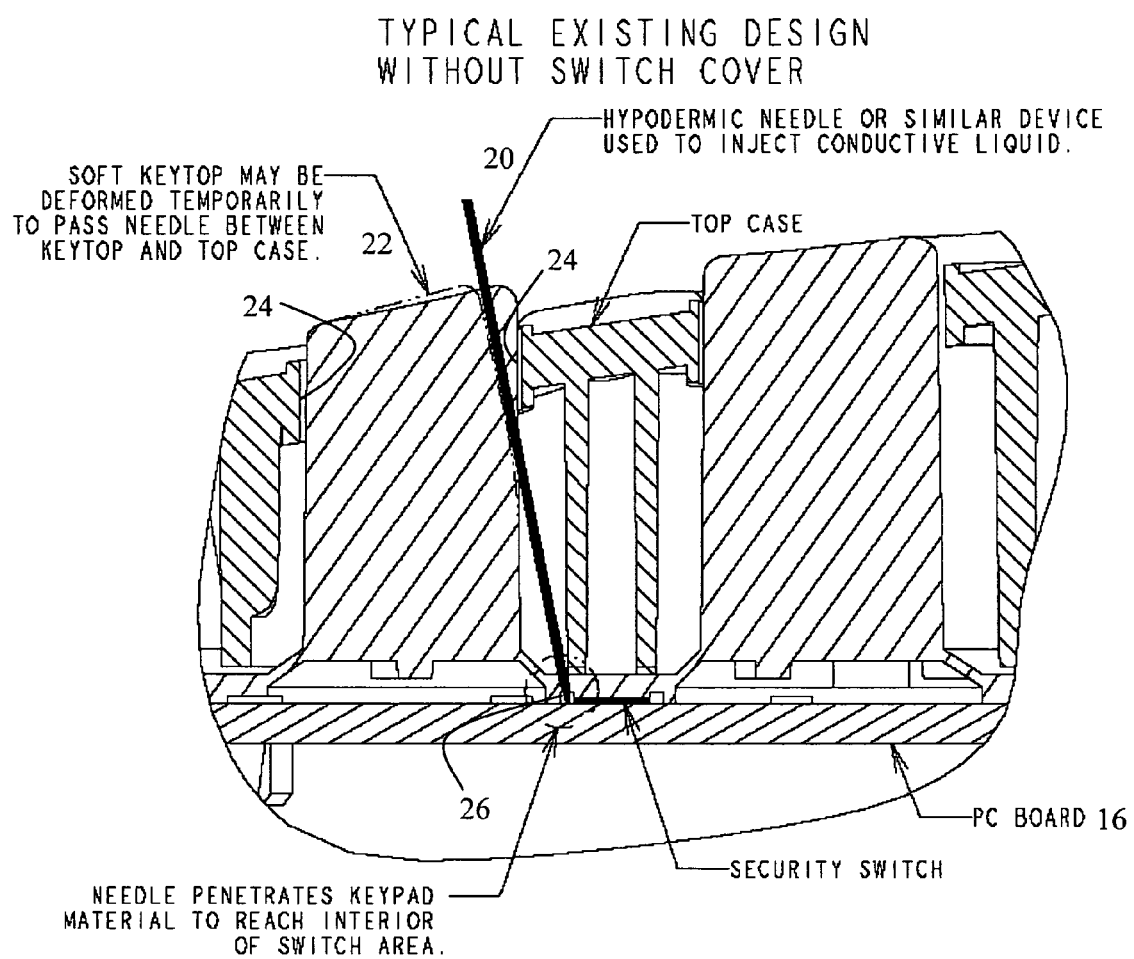
FIG. 2 is a magnified sectional view of a portion of the prior art terminal of FIG. 1, showing how a hypodermic needle may be used to attack the terminal.
Figure 3:
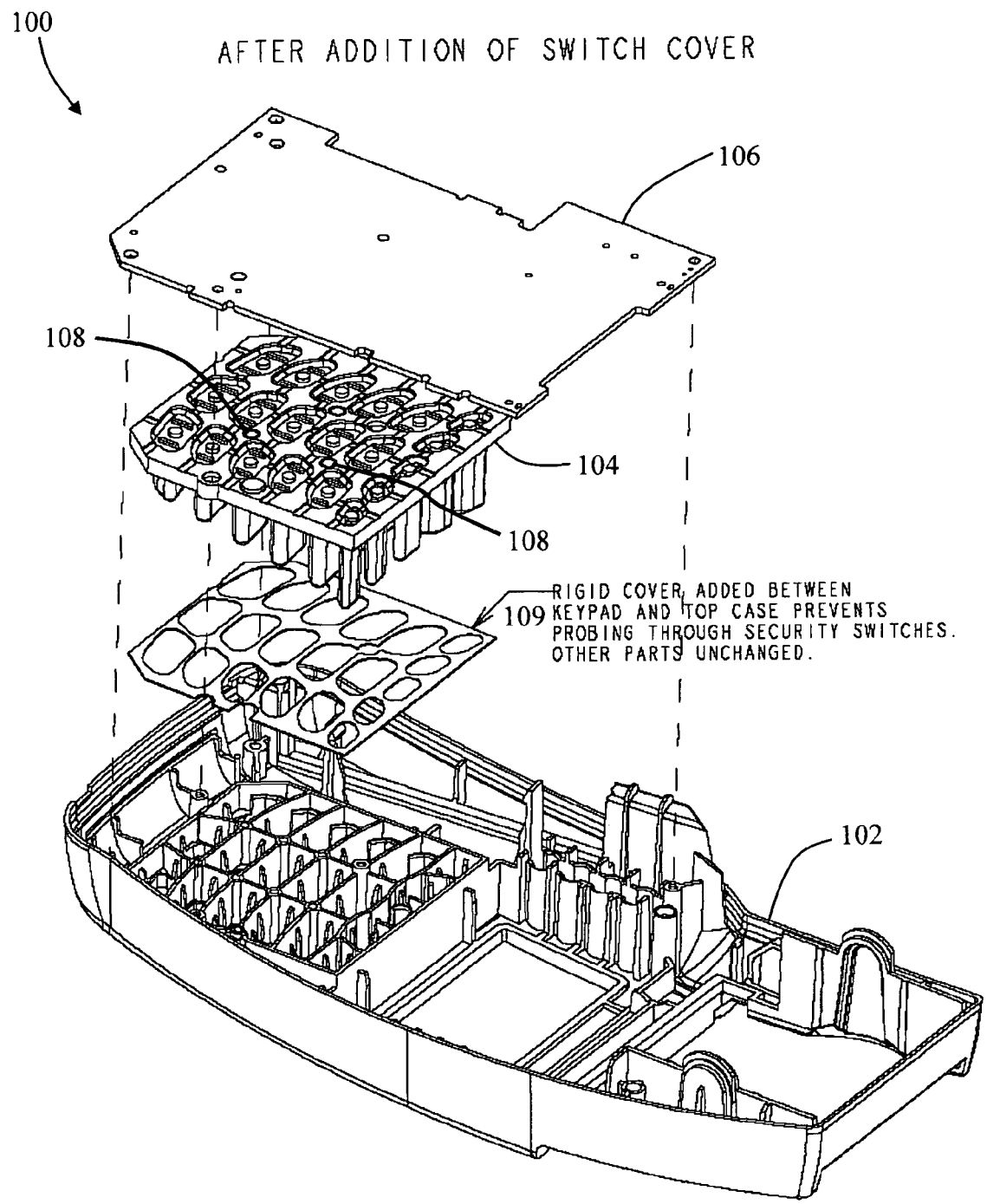
FIG. 3 is an exploded view of a portion of an improved point-of-sale terminal, including an additional rigid cover to prevent successful attacks by a foreign conductor, according to aspects of the present disclosure.

FIG. 3 shows a portion of an improved POS terminal 100, according to aspects of the present disclosure. Terminal 100 includes an outer case (of which the top portion, or top cover 102 is shown in FIG. 3), a keypad 104 including a plurality of keys, and a PCB 106. The terminal also includes one or more security switches 108 that may be attached to or formed integrally with the keypad. Security switches 108 generally may be formed from carbon or any other conductive material, and are configured to make conductive contact with a portion of the PCB when the terminal is assembled. For example, each switch 108 may be configured to make conductive contact with two or more conductive traces on the PCB when the terminal is assembled, thus completing a circuit between the traces. If the keypad is separated from the PCB, the circuit is broken, prompting one or more security measures (such as disablement of the terminal).

Terminal 100 also includes a barrier member configured to prevent successful attacks by a foreign conductor. In the embodiment depicted in FIG. 3, the barrier member is a rigid keypad cover 109 disposed between keypad 104 and top cover or upper casing 102 of the terminal. The barrier member includes a plurality of apertures configured to fit closely around the keys of the keypad. The keypad cover is configured to prevent penetration of a foreign conductor from a top surface of the terminal to a region in fluid communication with security switches 108 of the terminal, as will be described below in more detail.

Top cover 102 of the outer case includes one or more wall features that are configured to press the security switches against the PCB, to avoid accidental triggering of the security circuit. Top 102 also includes apertures for the keys of the keyboard to fit through, and may include one or more additional apertures for screws or other fastening devices to pass through. The fastening devices then may pass through other components of the terminal, including keypad cover 109, keypad 104, and/or PCB 106, securing these components to each other. Each of these components may include apertures for engaging such a fastening device rotationally or otherwise.

Figure 4:
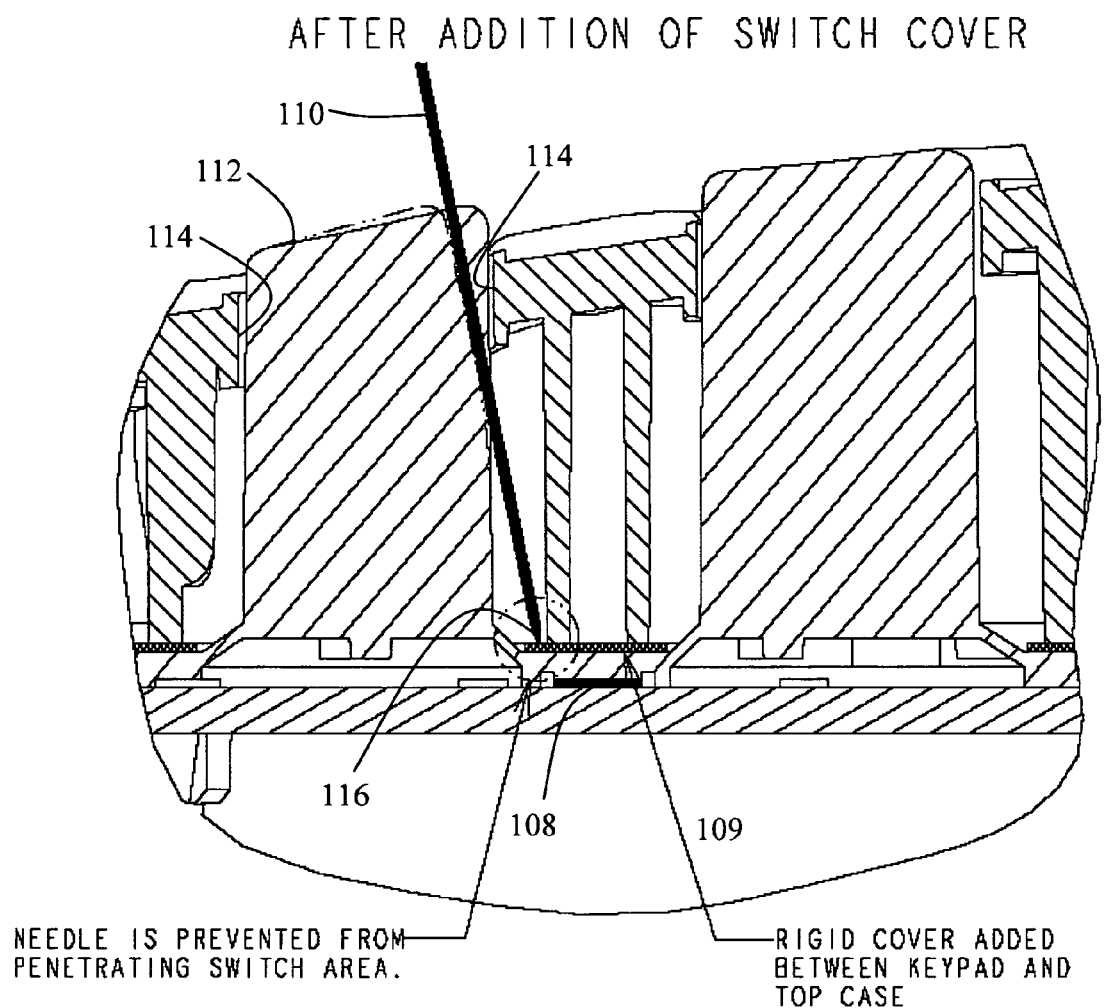
FIG. 4 is a magnified sectional view of a portion of the improved terminal of FIG. 3, showing how the additional rigid cover prevents attack by a hypodermic needle.

FIG. 4 depicts a magnified sectional view of a portion of terminal 100 of FIG. 3 being attacked by a hypodermic needle 110 filled with a conducting fluid. The hypodermic needle has penetrated the soft silicone of the keypad, and is being used to probe between the soft key tops 112 and the edges 114 of the keypad openings in the case. However, before the tip 116 of needle 110 can reach the vicinity of security switches 108, it is blocked by a portion of rigid cover 109, which fits closely around the keys of the keypad to prevent objects from probing beneath the keys. More specifically, cover 109 prevents tip 116 from reaching a region in fluid communication with switches 108, so that a conductive liquid injected through the needle by an attacker will not reach the security switch area. Thus, an attacker is prevented from shorting the security switches, and removing the keypad to tamper with the terminal.

Figure 5:
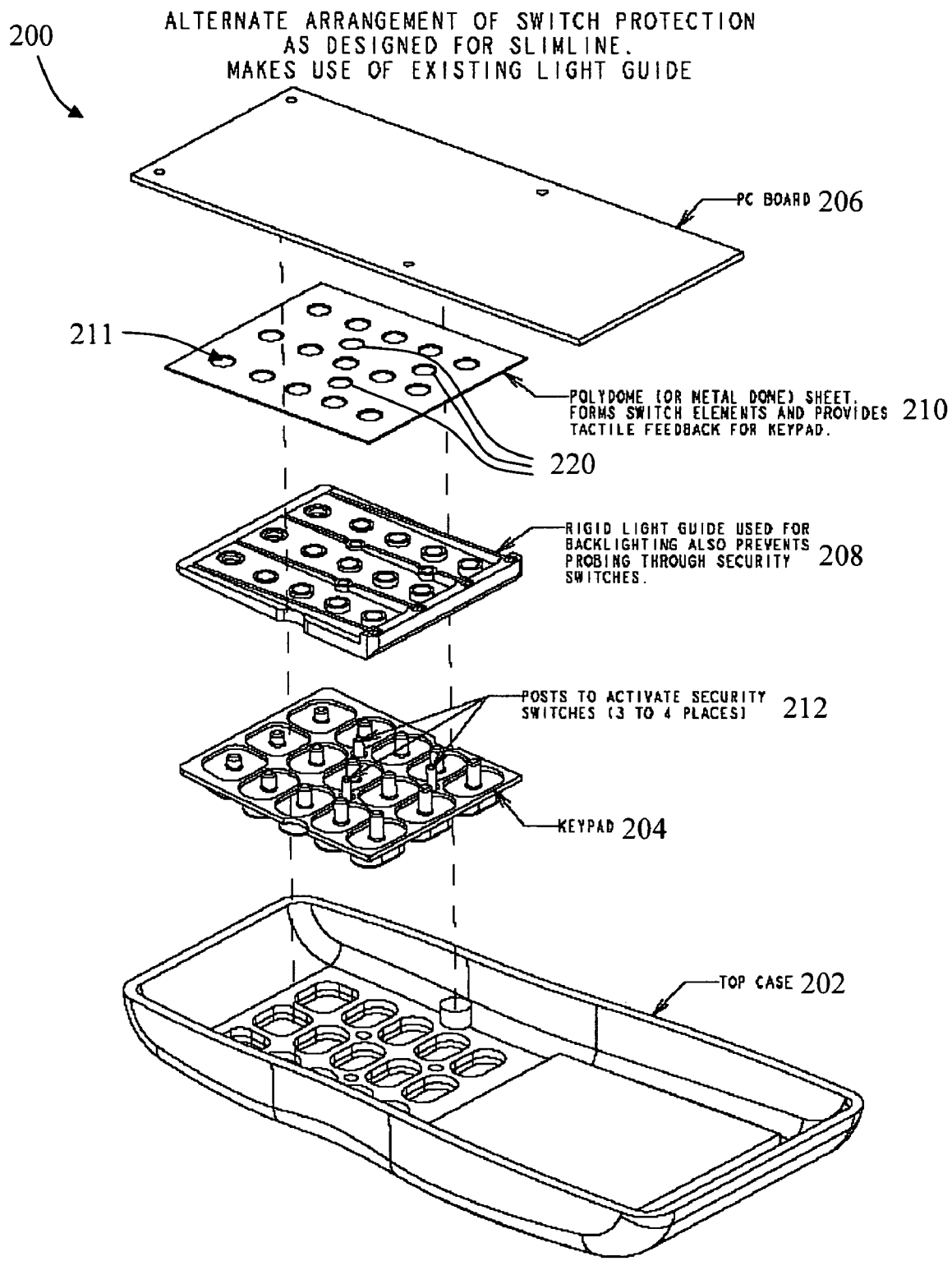
FIG. 5 is an exploded view of a portion of an alternate embodiment of an improved point-of-sale terminal, including a rigid backlighting guide that prevents successful attacks by a foreign conductor, according to aspects of the present disclosure.

FIG. 5 shows an alternate embodiment of a portion of an improved POS terminal, generally indicated at 200, according to aspects of the present disclosure. Terminal 200 includes an outer case (of which the top portion or top cover 202 is shown in FIG. 5), a keypad 204, a PCB 206, and a light guide 208. The light guide typically is disposed adjacent the bottom surface of the keypad, and may function to provide desired backlighting to the keypad. The terminal also includes a dome sheet 210 that typically is disposed adjacent to the PCB, domed regions 211 of which make conductive contact with the PCB when depressed by a key of keypad 204 and which provide tactile feedback to the keys.

As a security measure, keypad 204 may include one or more rigid posts 212 that force particular regions 213 of the dome sheet into conductive contact with the PCB whenever the terminal is assembled. These regions of conductive contact function as security switches, for example, by completing a circuit between two or more conductive traces on the PCB. When the terminal is disassembled, the circuit is broken, prompting security measures such as disablement of the terminal and erasure of security data. As an additional security measure to prevent an attacker from shorting the security circuits between the conductive traces on the PCB, light guide 208 also functions as a barrier member in a manner described below in greater detail.

Light guide 208 may be configured with a plurality of apertures, through which rigid posts 212 and the bottom portions of the keys of keypad 204 may pass. Thus, the light guide does not interfere with either the ordinary functioning of the keypad, or with the security switches of the terminal. The light guide also may include additional apertures for screws or other fastening devices that are configured to hold the various components of the terminal securely together. However, the light guide fits relatively closely around the fasteners (if any), the posts, and the bottom portions of the keys, and is constructed from a relatively rigid material that resists penetration by a sharp conductor such as a hypodermic needle.

Figure 6:
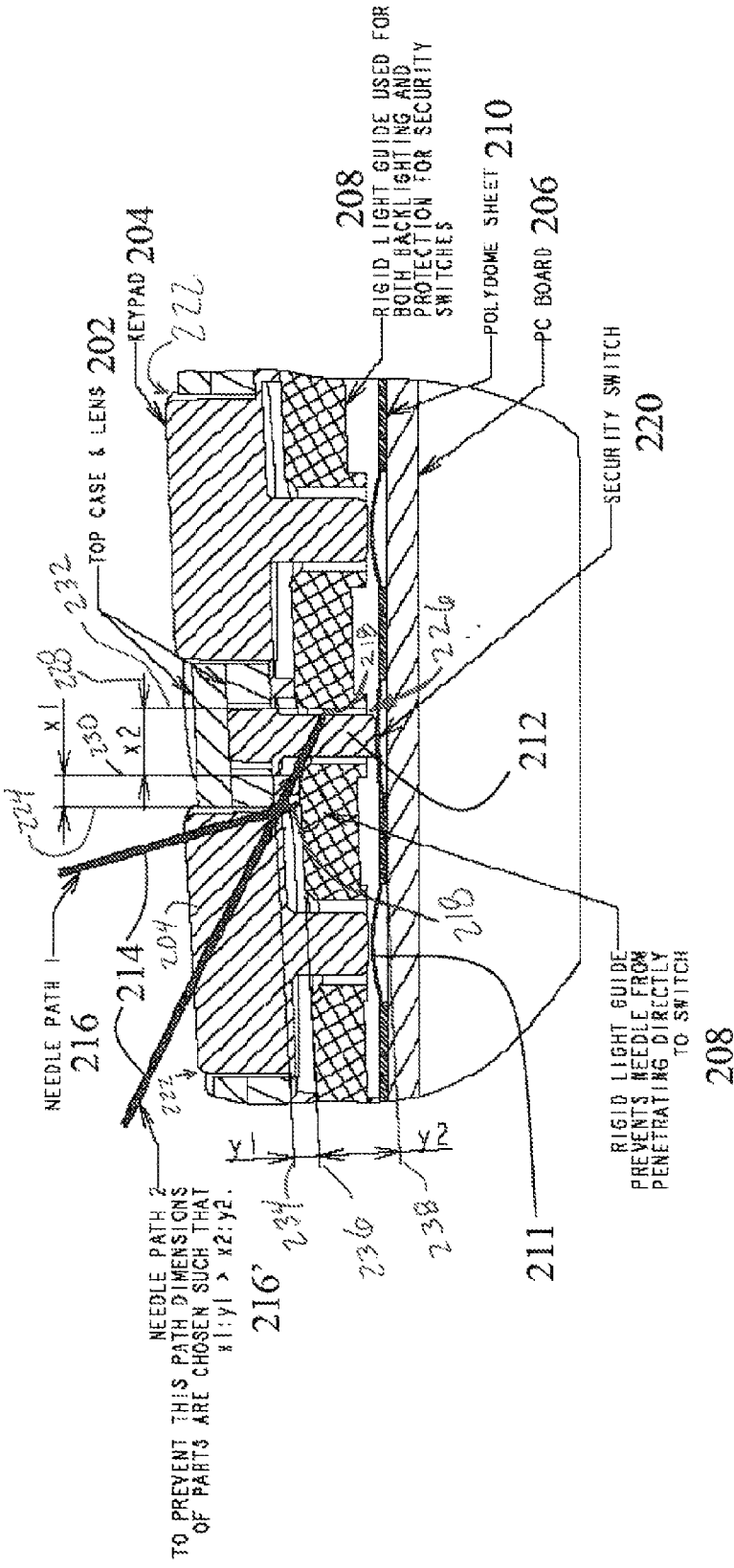
FIG. 6 is a magnified sectional view of a portion of the improved terminal of FIG. 5, showing how the rigid backlighting guide prevents attack by a hypodermic needle.

FIG. 6 depicts a magnified sectional view of a portion of improved terminal 200 shown in FIG. 5, illustrating how light guide 208 acts to prevent a successful attack on terminal 200 by a hypodermic needle 214. As indicated at 216, 216', an attack attempting to penetrate from the top surface of keypad 204 to dome sheet 210 is prevented by rigid light guide 208, which blocks the tip 218 of needle 214 from reaching security switch region 220 of the dome sheet. An attack along path 216 is prevented because a portion of the rigid light guide overhangs region 220, whereas an attack along the more oblique path 216' is prevented by a suitable choice of dimensions for the top case and the rigid posts 212 of the keypad. More specifically, as indicated in FIG. 6, such an oblique attack may be prevented if the dimensions are chosen such that the ratio x1:y1 is greater than the ratio x2:y2.

As shown for the embodiment of FIG. 6, keys 204 extend through openings 222 through top case 202. Each opening 222 is defined by an edge 224 extending around key 204. Each rigid post 212 extends through an aperture 226 through light guide 208. Aperture 226 defines a width 228 from a rim 230 to a side wall 232. Top case 202 has a lower surface 234 that faces an upper surface 236 of light guide 208. Dome sheet 210 has a lower surface 238 facing PCB 206. The following relationships among these structures may be defined:

x1 is a distance in a horizontal direction along top case 202 between edge 224 of opening 222 to rim 230 of adjacent aperture 226;

y1 is a distance in a vertical direction from lower surface 234 of top case 202 to upper surface 236 of light guide 208;

x2 is width 228 of light guide aperture 226 from rim 230 to side wall 232; and y2 is a distance in a vertical direction from upper surface 236 of light guide 208 to security region 220 at lower surface 238 of dome sheet 210.

Thus, x1 and y1 define a gap or path between top case 202 and light guide 208 through which a needle can be inserted, while x2 and y2 define a path down light guide aperture 226 leading to security region 220. As illustrated for needle path 216', light guide 208 fits sufficiently closely around rigid posts 212 to prevent needle 214 from reaching or piercing security region 220 of dome sheet 210. As one example of such sufficiently close fit, having the ratio of x1/y1 greater than the ratio of x2/y2 provides no path for the needle to reach security region 220 because the greater x1/y1 ratio means the needle needs to start at a lower grazing angle (more oblique path) than the angle (less oblique path) that would be necessary for needle tip 218 to reach all the way down aperture 226 to security region 220. Another way of characterizing the sufficiently close fit is to say that the rim of the light guide aperture is positioned sufficiently far from the edge of the upper case opening and the width of the aperture is sufficiently narrow to prevent the needle from passing through the opening and down the aperture to the security switch region.

The point-of-sale terminal may also be seen as incorporating a security device for preventing penetration of a foreign conductor into a region in fluid communication with a security switch of the point-of-sale terminal. The device may include a barrier member configured to be disposed inside the terminal and to resist penetration by a hypodermic needle.

The barrier member of the security device may be a rigid keypad cover configured to be disposed between a keypad of the terminal and an upper casing of the terminal, and may include a plurality of apertures configured to fit closely around keys of the keypad.

The barrier member of the security device also may be a rigid light guide configured to be disposed between a printed circuit board of the terminal and a keypad of the terminal, and to provide backlighting to the keypad, and may include a plurality of apertures configured to fit closely around keys of the keypad.

The point-of-sale terminal may be configured to prevent penetration of a foreign conductor into a region of the terminal in fluid communication with a security switch of the terminal. The terminal may include an outer case, a keypad including a plurality of keys configured to pass through apertures in the outer case, a printed circuit board for processing information entered using the keypad, at least one conductive security switch embedded in the keypad and configured to make conductive contact with the printed circuit board when the terminal is assembled, and a barrier member disposed within the outer case and configured to resist penetration by a hypodermic needle.

The barrier member of the point-of-sale terminal may be a rigid keypad cover disposed between the keypad and the outer case, and configured to fit closely around keys of the keypad.

The barrier member of the point-of-sale terminal also may be a rigid light guide disposed between the printed circuit board and the keypad. The barrier member may be configured to provide backlighting to the keypad, and may include a plurality of apertures configured to fit closely around keys of the keypad.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

I claim:

1. A security device for preventing penetration of a foreign conductor into a region in fluid communication with a security switch of a point-of-sale terminal, wherein the point-of-sale terminal includes a keypad and an upper casing adjacent the keypad, wherein the upper casing includes a plurality of openings, each opening defined by an edge, and the keypad includes a plurality of keys, the keys extending through the openings, and the security switch is located under the keypad separate from the keys and not directly beneath any of the openings in the upper casing for the keys, and wherein the point-of-sale terminal includes a rigid post between the upper casing and the security switch, the post positioned to close the security switch when the keypad, upper casing, and security switch of the point-of-sale terminal are assembled together and wherein the security switch opens to detect that the point-of-sale terminal is disassembled, the device comprising:

a barrier member configured to be disposed inside the terminal between the upper case and the security switch and the barrier member being sufficiently rigid to resist penetration by a hypodermic needle and configured to block the needle from penetrating through the keypad to the security switch, wherein, the barrier member includes an aperture configured to receive the rigid post therethrough and to fit sufficiently closely around the rigid post to prevent penetration by the hypodermic needle to the region in fluid communication with the security switch, and wherein the upper casing includes a lower surface, and further wherein the barrier member includes an upper surface, the upper surface configured to face the lower surface of the upper casing when the point-of-sale terminal is assembled, and wherein the aperture through the barrier member defines a width from a rim to a side wall, and wherein, with the terminal assembled, a ratio of x1/y1 is greater than a ratio of x2/y2 for the following definitions:

x1 is a distance from the edge of the upper casing opening adjacent the barrier member aperture to the rim of the aperture;

y1 is a distance from the lower surface of the upper casing to the upper surface of the barrier member;

x2 is the width of the aperture from the rim to the side wall; and y2 is a distance from the upper surface of the barrier member to the region in fluid communication with the security switch.

2. The security device of claim 1 for use with the point-of-sale terminal, wherein the point-of-sale terminal includes a printed circuit board under the keypad, and wherein the security switch is disposed on the printed circuit board, wherein the barrier member includes a light guide configured to be disposed between the printed circuit board of the terminal and the keypad of the terminal, further wherein the light guide is configured to provide backlighting to the keypad.

3. A point-of-sale terminal configured to prevent penetration of a foreign conductor, the terminal comprising:

an outer case having a plurality of openings therethrough, each opening defined by an edge, and wherein the outer case includes a lower surface, a keypad including a plurality of keys configured to pass through the openings of the outer case, a printed circuit board for processing information entered using the keypad, the printed circuit board including a region with a security switch located separate from the keys and not directly beneath any of the openings in the outer case for the keys, at least one rigid post between the outer case and the printed circuit board, the post configured to close the security switch when the terminal is assembled, and wherein the security switch opens to detect disassembly when the terminal is disassembled, and a barrier member disposed within the outer case between the case and the printed circuit board and wherein the barrier member includes an upper surface, the upper surface facing the lower surface of the outer case when the point-of-sale terminal is assembled, the barrier member configured to resist penetration by a hypodermic needle inserted through one of the outer case openings, the barrier member positioned to block the needle from reaching the security switch region, the barrier member including an aperture configured to receive the rigid post therethrough and to fit sufficiently closely around the rigid post to prevent penetration by the hypodermic needle to the security switch region, wherein the aperture of the barrier member includes a rim and a side wall and defines a width between the rim and the side wall, and wherein the rim is positioned sufficiently far from the closest edge of one of the openings of the outer case and the width is sufficiently narrow and the lower surface of the outer case is sufficiently close to the upper surface of the barrier member to prevent the needle from passing through the opening and down the aperture to the security switch region.

4. The point-of-sale terminal of claim 3, further including a sheet disposed over the printed circuit board, the sheet including a dome at the security switch region and wherein the rigid post depresses the dome to close the security switch.

5. The point-of-sale terminal of claim 3, wherein the outer case includes a lower surface, and further wherein the barrier member includes an upper surface facing the lower surface of the outer case when the terminal is assembled, and wherein the aperture through the barrier member defines a width from a rim to a side wall, and wherein, with the terminal assembled, a ratio of $x1/y1$ is greater than a ratio of $x2/y2$ for the following definitions:

$x1$ is a distance from the edge of the outer case opening adjacent the barrier member aperture to the rim of the aperture;

$y1$ is a distance from the lower surface of the outer case to the upper surface of the barrier member;

$x2$ is the width of the aperture from the rim to the side wall; and $y2$ is a distance from the upper surface of the barrier member to the security switch region.

6. The point-of-sale terminal of claim 3 wherein the barrier member is a light guide disposed between the printed circuit board and the keypad, wherein the light guide is configured to provide backlighting to the keypad.

* * * * *